United States Patent
Salimi et al.

(10) Patent No.: US 11,613,087 B2
(45) Date of Patent: Mar. 28, 2023

(54) MOLD PRECISION PINS FOR COMPONENT LOCATION DURING FABRICATION OF WIND TURBINE BLADES

(71) Applicant: TPI Technology, Inc., Scottsdale, AZ (US)

(72) Inventors: Amir Salimi, Providence, RI (US); Michael P. Villar, Bacolod (PH); Christopher Raine, Cranston, RI (US)

(73) Assignee: TPI TECHNOLOGY, INC., Scottsdale, AZ (US)

(*) Notice: Subject to any disclaimer, the term of this patent is extended or adjusted under 35 U.S.C. 154(b) by 258 days.

(21) Appl. No.: 16/894,150

(22) Filed: Jun. 5, 2020

(65) Prior Publication Data

US 2020/0384708 A1 Dec. 10, 2020

Related U.S. Application Data

(60) Provisional application No. 62/858,733, filed on Jun. 7, 2019, provisional application No. 62/858,723, filed on Jun. 7, 2019.

(51) Int. Cl.
*B29C 70/54* (2006.01)
*B29C 70/34* (2006.01)
(Continued)

(52) U.S. Cl.
CPC .......... *B29C 70/541* (2013.01); *B29C 70/345* (2013.01); *B29K 2105/0872* (2013.01); *B29L 2031/085* (2013.01)

(58) Field of Classification Search
CPC ............... B29C 70/345; B29C 70/541; B29C 2043/3602; B29C 33/14
See application file for complete search history.

(56) References Cited

U.S. PATENT DOCUMENTS 3,525,365 A * 8/1970 Boyle ................. F16B 3/06
215/358
3,610,457 A * 10/1971 Opalewski ............ B29C 41/08
220/563

(Continued)

FOREIGN PATENT DOCUMENTS

WO WO-2016/189092 A1 12/2016

OTHER PUBLICATIONS

International Search Report and Written Opinion for International Application No. PCT/US20/36386 dated Oct. 21, 2020.

*Primary Examiner* — Matthew J Daniels
(74) *Attorney, Agent, or Firm* — Stephen J. Kenny; Vincenzo DiMonaco; Foley Hoag LLP

(57) ABSTRACT

Provided herein is a wind turbine blade mold system having built in precision pins to locate structural components (e.g. spar caps) during layup of composite segments. A plurality of pins can be inserted through the layers of composite layups and into apertures within the mold, with spar caps positioned against the pins to ensure precise positioning, thereby preventing/inhibiting movement of the spar cap relative to the mold. A plurality of pins can be inserted through the layers of composite layups and into apertures within the mold, with cams attached to the pins and moveable to engage spar caps to ensure precise positioning of the spar cap, as well as preventing any drift during subsequent operations. The pins can remain embedded within the final molded part.

14 Claims, 13 Drawing Sheets

(51) Int. Cl.
*B29K 105/08* (2006.01)
*B29L 31/08* (2006.01)

(56) References Cited

U.S. PATENT DOCUMENTS

| | | | |
|---|---|---|---|
| 4,191,604 A * | 3/1980 | MacTurk | B29C 70/56 |
| | | | 343/912 |
| 7,726,692 B2 | 6/2010 | Ozaki et al. | |
| 9,573,325 B2 | 2/2017 | Davis et al. | |
| 9,599,094 B2 | 3/2017 | Dahl et al. | |
| 2011/0073237 A1 | 3/2011 | Rajasingam | |
| 2015/0251362 A1* | 9/2015 | Kirkeby | B29C 70/541 |
| | | | 425/500 |
| 2015/0314506 A1* | 11/2015 | Stumpf | B29C 45/2608 |
| | | | 277/630 |
| 2018/0216601 A1 | 8/2018 | Yarbrough et al. | |

\* cited by examiner

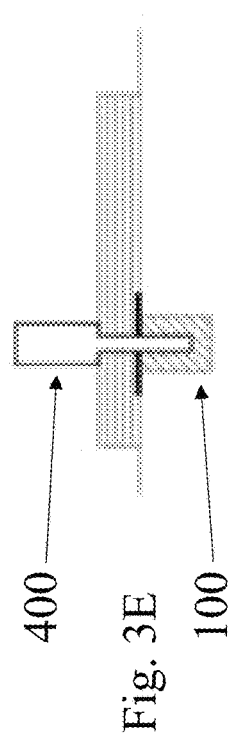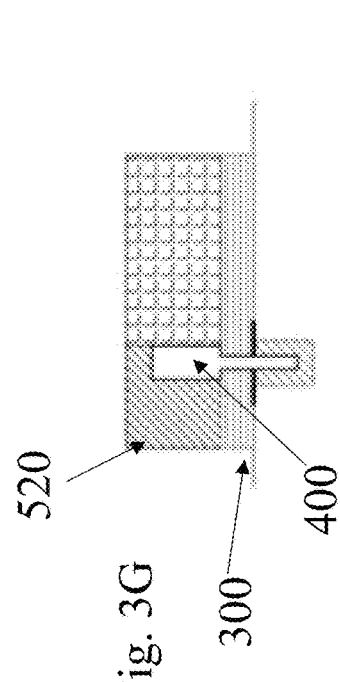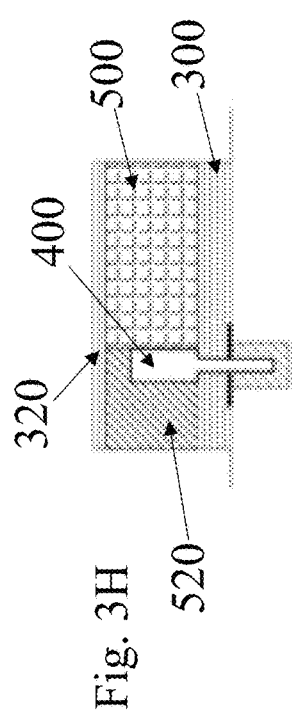

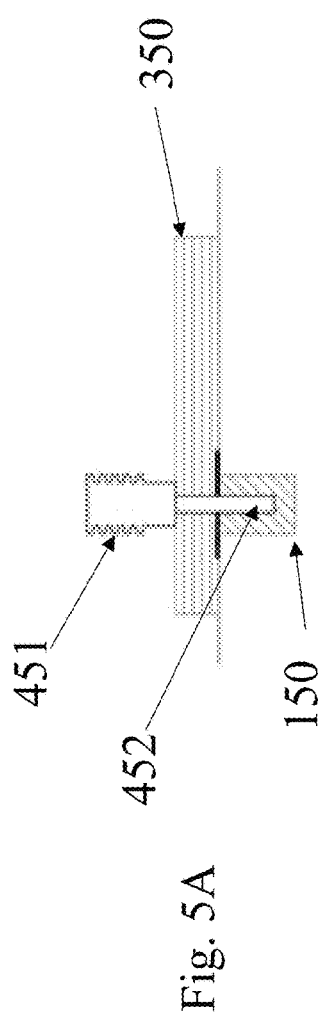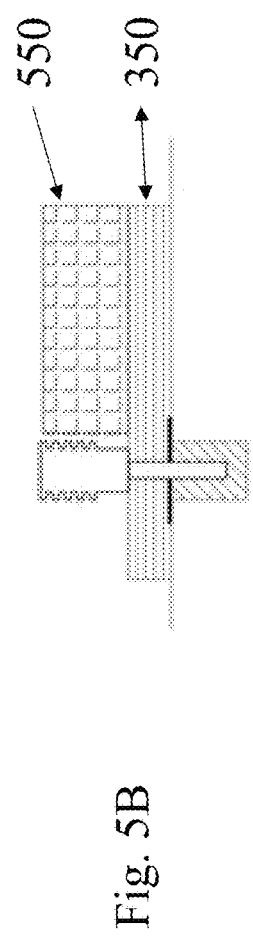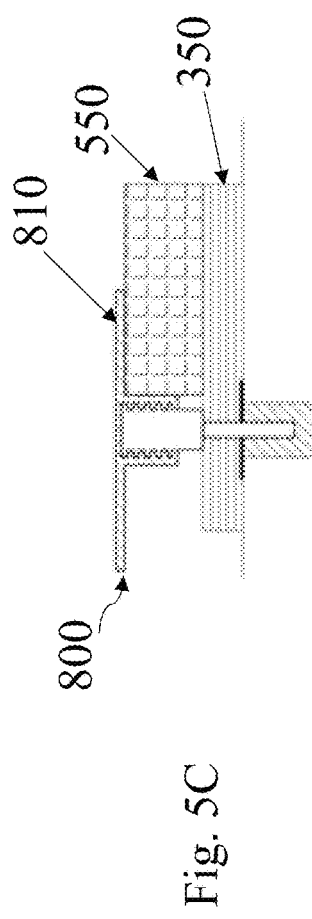

US 11,613,087 B2

MOLD PRECISION PINS FOR COMPONENT LOCATION DURING FABRICATION OF WIND TURBINE BLADES

CROSS-REFERENCE TO RELATED APPLICATIONS

This application claims the benefit of priority under 35 USC 119 to U.S. Provisional application No. 62/858,723 filed Jun. 7, 2019, and Provisional application No. 62/858,733 filed Jun. 7, 2019 the entire contents of each are hereby incorporated by reference.

BACKGROUND OF THE DISCLOSED SUBJECT MATTER

Field of the Disclosed Subject Matter

The disclosed subject matter relates to a system, and corresponding method, of manufacturing large scale composite structures, e.g. wind turbine blades. These large scale composite structures are typically formed from a two-piece mold which, once the blade halves are molded, require a complex component location/installation, and subsequent mold closure process, to complete fabrication.

Particularly, the present disclosure provides structural elements, e.g. elongated pins, having various features which facilitate both placement and assembly of other components, e.g., spar caps. In some embodiments the present disclosure provides positioning elements, e.g. elongated pins, studs and cams. As any minor violation of positioning tolerances for spar caps not only compromises the structural integrity of the blade due to lowering the bending stiffness, but also exceeds the tolerance of bond gaps due to shifts in the core material. The present disclosure provides precise positioning of spar caps within the blade mold throughout the layup process.

Description of Related Art

Wind turbine blades generally comprise a hollow blade shell made primarily of composite materials, such as glass-fiber reinforced plastic. The blade shell is typically made up of two half shells, a lower pressure-side shell and an upper suction-side shell, which are molded separately in respective female half molds, before being bonded together along flanges at the leading and trailing edges of the blade. An exemplary view of a mold half for a wind turbine blade is illustrated schematically in FIG. 1A-C.

Referring to FIG. 1a, this shows a mold 10 for a wind turbine blade divided into two half molds, an upper suction-side mold 10a and a lower pressure-side mold 10b, which are arranged side by side in an open configuration of the mold. A pressure side blade shell 12a is supported on a mold surface 14a of the lower mold 10a and a suction side blade shell 12b is supported on a mold surface 14b of the upper mold 10b. The shells 12a, 12b are each made up of a plurality of glass-fiber fabric layers, which are bonded together by cured resin.

After forming the shells 12a, 12b in the respective mold halves 10a, 10b, shear webs 16 are bonded to spar caps positioned on or within an inner surface 17 of the windward blade shell 12a. The shear webs 16 are longitudinally-extending structures that bridge the two half shells 12a, 12b of the blade and serve to transfer shear loads from the blade to the wind turbine hub in use. In the particular embodiment shown in cross-section in FIG. 1a, the shear webs 16 each comprise a web 18 having a lower edge 19 comprising, optionally, a first longitudinally-extending mounting flange 20 and an upper edge 21 comprising, optionally, a second longitudinally-extending mounting flange 22. Adhesive such as epoxy is applied along these mounting flanges 22 in order to bond the shear webs 16 to the respective spar caps of each half shell 12a, 12b.

As shown in FIG. 1b, once the shear webs 16 have been bonded to the upper blade shell 12a, adhesive is applied along the second (upper) mounting flanges 22 of the shear webs 16, and along the leading edge 24 and trailing edge 26 of the blade shells 12a, 12b. The upper mold 10b, including the upper blade shell 12b, is then lifted, turned and placed on top of the lower blade mold 10a in order to bond the two blade half shells 12a, 12b together along the leading and trailing edges 24, 26 and to bond the shear webs 16 to spar caps along an inner surface 28 of the upper blade shell 12b. The step of placing one mold half on top of the other is referred to as closing the mold.

Referring now to FIG. 1C, a problem can arise when the mold 10 is closed whereby the shear webs 16 may move slightly relative to the upper shell 12b. For example, the shear webs 16 may move slightly under their own weight during mold closing or they may be dislodged by contact with the upper shell 12b. Additionally or alternatively, the shear webs and spar caps can be inaccurately placed within the open mold halves prior to closing, resulting in a compromised or defective blade build. Furthermore, the concave curvature of the upper shell 12b also has a tendency to force the shear webs 16 together slightly, as shown in FIG. 1C. Such movement of the shear webs 16 during mold closing may result in the shear webs 16 being bonded to the spar caps and/or upper shell 12b at a sub-optimal position.

As blades are ever increasing in size in order to improve the operational efficiency of wind turbines, safety margins decrease thus requiring manufacturing acceptance criteria and tolerances to become stricter. This necessitates the design and implementation of manufacturing tools that enable high precision process checks to satisfy strict specifications and requirements.

There thus remains a need for an efficient and economic method and system for providing high precision placement and bonding of the internal components, e.g. spar caps, during the assembly phase of wind turbine devices that ensure proper placement of the components, without impacting the structure of the product.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes: a wind turbine blade mold system comprising: a first mold surface; at least one aperture located within the first mold surface, the at least one aperture configured to receive a pin; a cover disposed above the at least one aperture, the cover configured to receive a plurality of layers of composite material disposed thereon; at least one pin having a first end and a second end defining a sidewall with a length extending therebetween, the second end of the pin disposed within the at least one aperture and the first end of the pin extending above the first mold surface; wherein a portion of the pin sidewall is configured to engage a structural component of a wind turbine blade.

In some embodiments, a plurality of apertures are asymmetrically disposed about a spanwise central axis of the blade mold, and/or along the length of the blade mold. A perimeter of the first end of the pin can be greater than a perimeter of the second end of the pin; and/or at least one pin can be configured with an asymmetric geometry.

In some embodiments at least one pin extends beyond the upper surface of the composite material disposed on the first surface of the mold. In some embodiments the cover includes a frangible portion, the frangible portion retained within the pin upon insertion of the pin into the aperture. In some embodiments the second end of the pin includes a planar top surface, with a structural component disposed against the planar top surface. In some embodiments the second end of the pin includes a planar top surface, with at least one layer of composite material disposed above the planar top surface of the pin. In some embodiments a compression plate is included having at least one flange to engage the structural component of the blade. In some embodiments the second end of the pin includes a locking feature, the locking feature configured to engage the compression plate. In some embodiments the structural component of a wind turbine blade is a spar cap.

In accordance with another aspect of the disclosure, a method of forming a wind turbine blade is provided which comprises: providing a first mold surface, the first mold surface including at least one aperture; positioning a cover over the at least one aperture; depositing a first section of a plurality of layers of composite material over the cover; inserting at least one pin into the at least one aperture, the pin having a first end and a second end defining a sidewall with a length extending therebetween, wherein the at least one pin extends through the cover and plurality of layers of composite material, positioning a spar cap within the mold, the spar cap having a top surface and a bottom surface defining a sidewall with a length extending therebetween; and engaging at least a portion of the pin sidewall with at least a portion of the spar cap sidewall.

In some embodiments the method further comprises depositing a second section of a plurality of layers of composite material over the pin and spar cap. In some embodiments the method further comprises sealingly attaching a bag around a perimeter of the mold. In some embodiments the method further comprises impregnating at least a portion of the plurality of layers of composite material with a resin. In some embodiments the method further comprises removing from the mold an assembled product including the first section of a plurality of layers of composite material, the at least one pin, the spar cap, and the second section of a plurality of layers of composite material; wherein a first end of the at least one pin extends beyond the external surface of the first section of a plurality of layers of composite material. In some embodiments the method further comprises trimming at least a portion of the first end of the at least one pin. In some embodiments engaging includes engaging at least a portion of the pin sidewall with at least a portion of a first spar cap sidewall, and engaging at least a portion of the pin sidewall with at least a portion of a second spar cap sidewall. In some embodiments engaging includes engaging a top surface of the at least one pin with at least a portion of a first spar cap.

In some embodiments, the disclosed subject matter includes: a wind turbine blade mold system comprising: a first mold surface, with at least one aperture located therein; at least one stud having a first end and a second end defining a length therebetween, the second end of the pin disposed within the at least one aperture; at least one pin having a first end and a second end defining a length therebetween, with the second end of the pin connected to the first end of the at least one stud; at least one actuator, the at least one actuator disposed on the at least one pin, wherein a portion of the actuator is configured to engage a structural component of a wind turbine blade.

In some embodiments, a plurality of apertures asymmetrically disposed about a spanwise central axis of the blade mold. In some embodiments, a plurality of apertures disposed about along the length of the blade mold. In some embodiments, the first end of the stud extends beyond the first surface of the mold. In some embodiments, the pin is releasably connected to the stud. In some embodiments, the first end of the pin extends beyond an upper surface of a composite material disposed on the first surface of the mold. In some embodiments, the at least one actuator includes a cam, the cam rotatable about a central axis of the at least one pin. In some embodiments, the at least one actuator includes an asymmetric cam. In some embodiments, the structural component is disposed between two actuators, the actuators indicating a location of the midpoint of the structural component. In some embodiments, the structural component of a wind turbine blade is a spar cap.

In accordance with another aspect of the disclosure, a method of forming a wind turbine blade is provided which comprises: providing a first mold surface, the first mold surface including at least one aperture; inserting at least one stud into the at least one aperture; connecting a pin to the at least one stud; depositing a first section of a plurality of layers of composite material into the mold, a second end of the at least one pin extending above the first section of composite material; positioning a spar cap within the mold, the spar cap having a top surface and a bottom surface defining a sidewall with a length extending therebetween; and actuating at least one cam to engage at least a portion of the cam with at least a portion of the spar cap sidewall.

In some embodiments the method further comprises depositing a second section of a plurality of layers of composite material over a first end of the pin and spar cap. In some embodiments the method further comprises sealingly attaching a bag around a perimeter of the mold. In some embodiments the method further comprises impregnating at least a portion of the plurality of layers of composite material with a resin. In some embodiments the method further comprises removing from the mold an assembled product including the first section of a plurality of layers of composite material, the at least one pin, the spar cap, and the second section of a plurality of layers of composite material. In some embodiments actuating the at least one cam provides a measurement of the spar cap midpoint. In some embodiments positioning a spar cap includes disposing the spar cap between two cams. In some embodiments a first cam is rotated a first distance and a second cam is rotated a second distance. In some embodiments the at least one cam is configured with an asymmetric shape. In some embodiments the at least one cam is removably connected to the at least one pin.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIGS. 3A-K are cross-sectional views of a various stages of blade fabrication and pin installation, in accordance with an embodiment of the present disclosure.

FIGS. 5A-C are a cross-sectional views of a various pin geometries providing a compressive force, in accordance with the present disclosure.

DETAILED DESCRIPTION OF AN EXEMPLARY EMBODIMENT

Figure 1A:
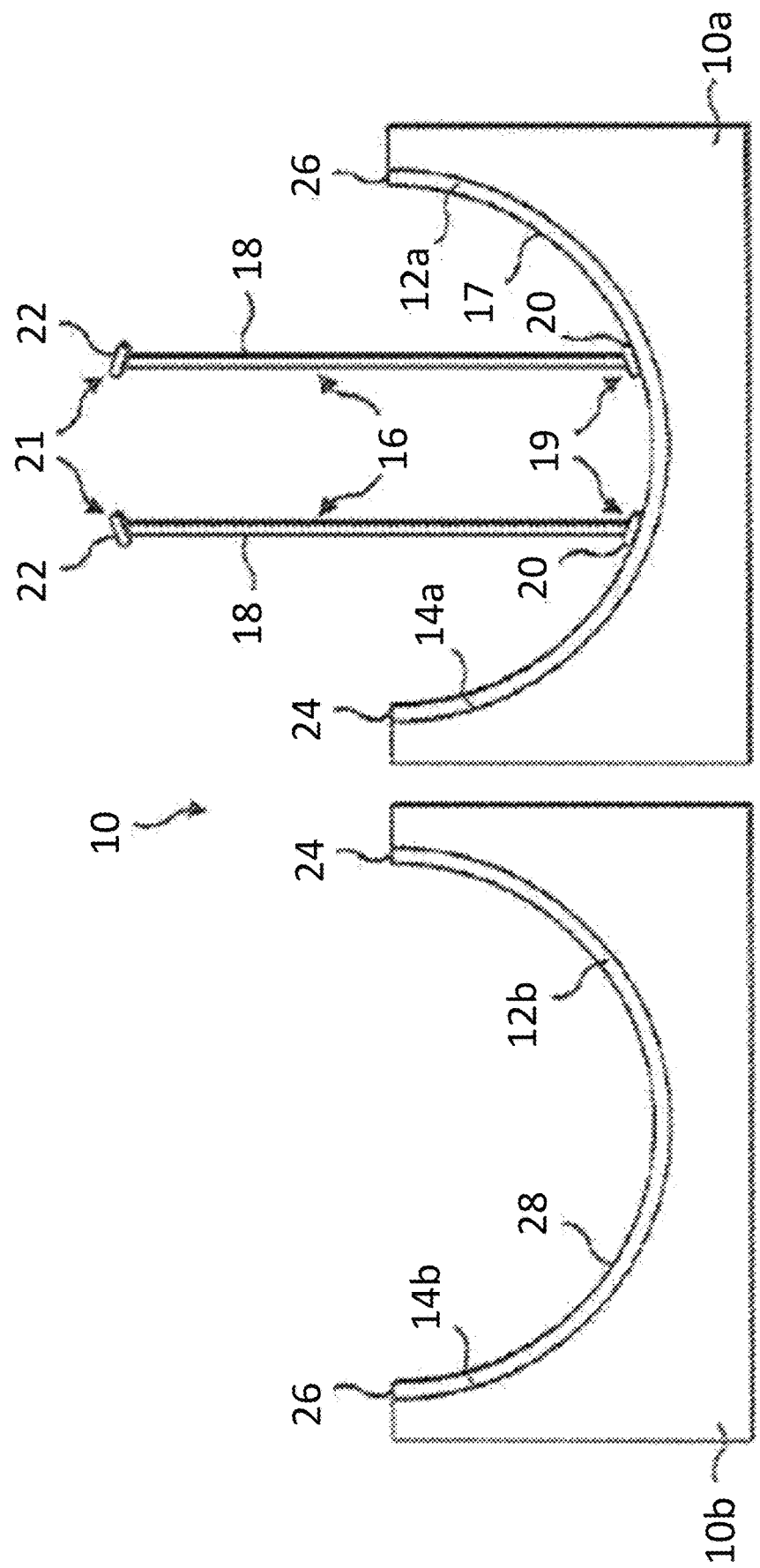
FIGS. 1A-C depict cross-sectional views of a conventional wind turbine blade mold and manufacturing method.
Figure 1B:
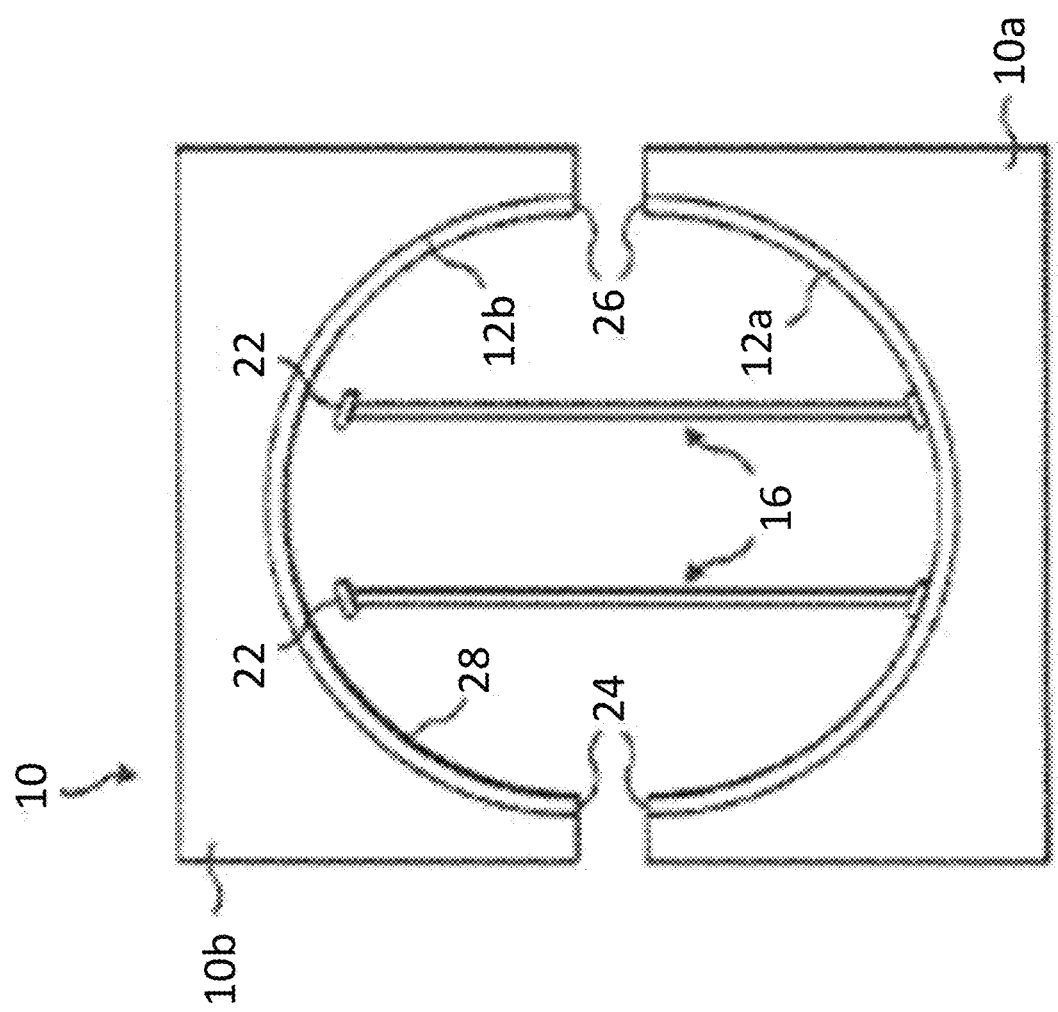
Figure 1C:
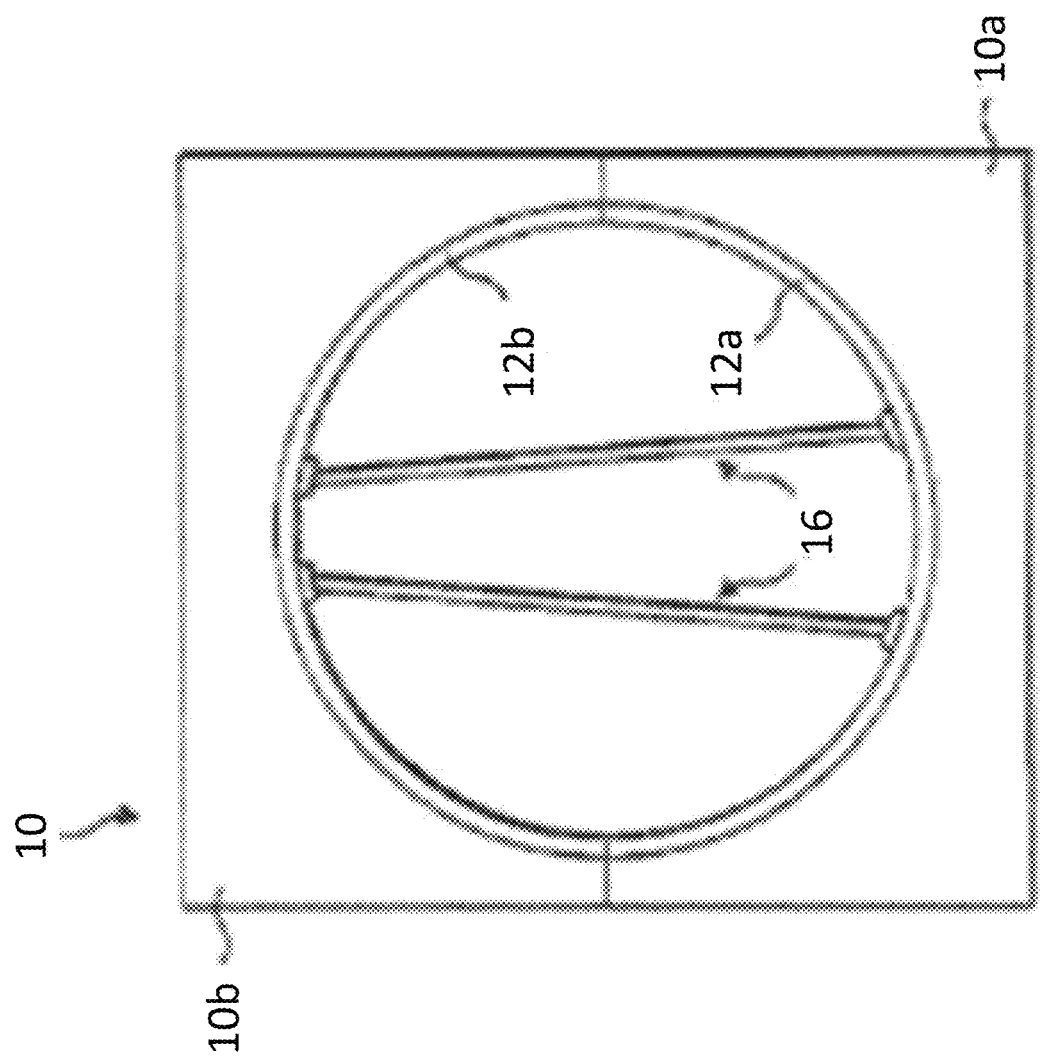

Reference will now be made in detail to exemplary embodiments of the disclosed subject matter, an example of which is illustrated in the accompanying drawings. The method and corresponding steps of the disclosed subject matter will be described in conjunction with the detailed description of the system.

The methods and systems presented herein may be used for large structure construction. The disclosed subject matter is particularly suited for construction of wind turbine blades. For purpose of explanation and illustration, and not limitation, an exemplary embodiment of the system in accordance with the disclosed subject matter is shown in FIGS. 2-5 and is designated generally by reference character 1000. Similar reference numerals (differentiated by the leading numeral) may be provided among the various views and Figures presented herein to denote functionally corresponding, but not necessarily identical structures.

A blade may include one or more structural components configured to provide increased stiffness, buckling resistance and/or strength to the blade. For example, the blade may include a pair of longitudinally extending spar caps configured to be engaged against the opposing inner surfaces of the pressure and suction sides of the blade, respectively. Additionally, one or more shear webs may be disposed between the spar caps so as to form a beam-like configuration. The spar caps may generally be designed to control the bending stresses and/or other loads acting on the blade in a generally spanwise direction (a direction parallel to the span of the blade) during operation of a wind turbine. Similarly, the spar caps may also be designed to withstand the spanwise compression occurring during operation of the wind turbine.

The spar caps of the present disclosure can be constructed of a plurality of pultruded members grouped together to form a first portion of the spar caps. In certain embodiments, the pultruded members may be formed by impregnating a plurality of fibers (e.g. glass or carbon fibers) with a resin and curing the impregnated fibers. The fibers may be impregnated with the resin using any suitable means known in the art. Further, the resin may include any suitable resin material, including but not limited to polyester, polyurethane, polybutylene terephthalate (PBT), polyethylene terephthalate (PET), vinyl ester, epoxy, or similar. Further, as shown, the pultruded members separate into one or more pultruded member bundles as the spar cap approaches the blade root so as to form a second portion of the spar cap.

More specifically, the spar cap is constructed of a plurality of pultruded members grouped together to form one or more layers. Thus, the layers may be stacked atop one another and joined together using any suitable means, for example, by vacuum infusing the members together or by bonding the members together via an adhesive, a semi-preg material, a pre-preg material, or similar.

High Precision Placement Pins

The methods and systems described herein facilitate high precision component placement, e.g. spar caps, during molding processes. Particularly, the present disclosure introduces a novel apparatus and method which provides accurate geometric references throughout the blade span, and in some embodiments, can be used as a mechanical stop for components that require a rigid support surface. In some embodiments, the present disclosure can include over-head optical projection and laser tracking systems to assist in locating and measurement tools to place components and reinforcement layers during layup process.

Figure 2:
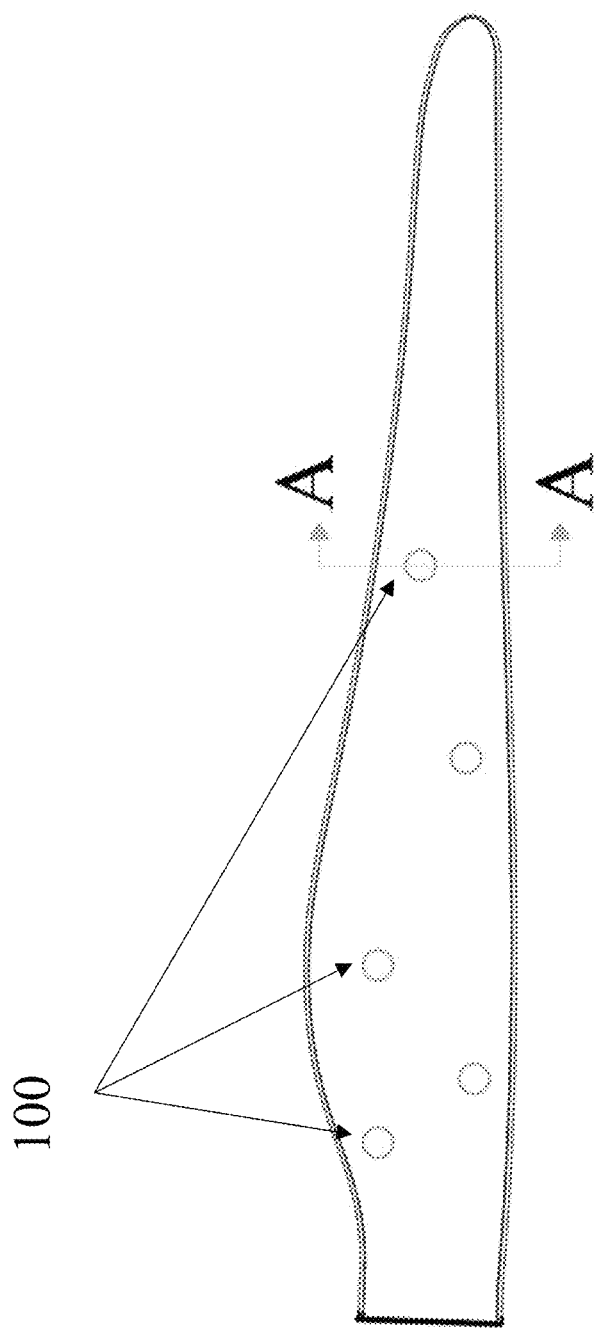
FIG. 2 is a schematic top view of a mold half with exemplary pin locations in accordance with an embodiment of the present disclosure.

FIG. 2 depicts a top view of a blade half, with a plurality of apertures (100) distributed along the blade span. The apertures (100) can be a hole (extending completely through the mold surface), recess or indentation (of sufficient depth to receive the locating feature or "pin" as described below) within the mold surface, and will be referred to as "pin holes" throughout for convenience. The location(s) of the pin holes (100) are specified in the 3D manufacturing model of the blade mold. In order to fabricate the mold (which will be employed to fabricate wind turbine blades), a male "plug" is first formed to serve as the structure which imparts the specified geometry into the mold. During plug build, precision pin holes are formed, e.g., CNC machined, into the plug surface. The pin holes (100) are thereafter transferred to the final mold and can serve as reference point(s) to calibrate and verify proper positioning of any overhead laser projection or Faro measurement system. While a plurality of pin holes (100) are permanently formed in the mold, select pin holes can be plugged or occluded if not employed for receiving a pin, as described in more detail below.

The number and location of the pin holes (100) can vary depending on blade design specifications, e.g., number of spar caps, location and size, etc. As shown in FIG. 2, the distribution of pin holes (100) need not be uniform but instead concentrated in select areas of the blade. The number, distribution and geometry of the pin hole(s) can vary along the blade span, e.g., there can be a greater concentration of pin holes (100) at locations with large/heavy internal components and/or more complex geometry or surface contours, e.g., with a greater number of pin holes (100) located proximate the root as compared to the tip of the blade.

Figure 3A:
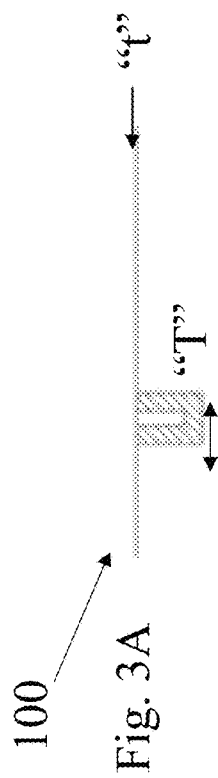

FIG. 3A depicts a cross sectional view of an exemplary pin hole (100). This exemplary embodiment of pin hole (100) depicts a cylindrical hole, however alternative geometries (e.g. curved, non-linear) are within the scope of the present disclosure. Also, the pin hole (100) can have a reinforced cavity for receiving the pin such that the perimeter of the sidewall defining the pin hole has a thickness "T" which is greater than the thickness "t" of the mold surface proximate the pin hole. This additional thickness provides strength and rigidity in the pin hole (100) for receiving and guiding the pin when inserted therein.

Figure 3B:
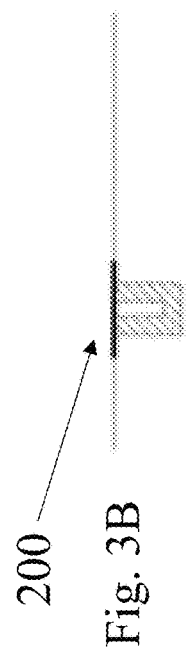

FIG. 3B depicts a cover or mask member (200) which can overlay the pin hole (100) prior to blade manufacturing steps (e.g., gel application) to avoid resin ingress into the pin holes.

Figure 3C:
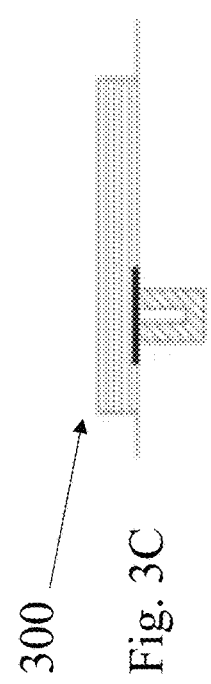

FIG. 3C depicts a plurality of layers of composite fiber panels, or "layups" (300) (which form the composite blade) deposited on top of the cover (200) which is disposed on top of the pin hole (100) and prevented from entering the pin hole due to cover (200). The cover (200) can be sized such that the perimeter of the cover is larger than, and circumscribes, the pin hole (100). The layup(s) can be sized such that the perimeter of the layup segment(s) is larger than, and circumscribes, the cover (200) and the pin hole (100).

Figure 3D:
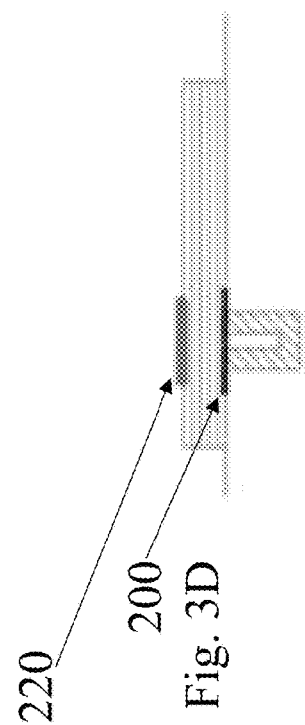

FIG. 3D depicts the identification of the underlying pin holes (100) on the top surface of the layup (300), to facilitate placement of the corresponding male pins for insertion into the pin holes (100). The identification can be achieved via an overhead optical (e.g. laser) projection system which illuminates or superimposes the pin hole location (220) on the layup surface (300). In some embodiments, the cover (200) can be formed with location indicating features (e.g. contrasting color, radiopaque material, etc.) that is detectable through/under the layers of layup segments to allow operators to visually detect the location (220) of the pin holes (100) throughout a mold.

FIG. 3E depicts the insertion of the locating feature (400) which can be a pin, or an elongated member (e.g. wall), though this disclosure will refer to the locating feature as "pin" throughout for convenience (however it is to be understood that alternative, e.g. non-cylindrical, geometries are contemplated to be within the scope of the present disclosure). As shown, pin(s) (400) extend through and beyond the layup segments (300), and through the cover (200) having a distal end of the pin received within the pin hole (100). In the exemplary embodiment shown, the distal end of the pin (400) remains within the pin hole (100). The cover (200) can include a frangible portion (directly above, and commensurate in size/shape to the underlying pin hole) that breaks or severs upon insertion of the pin (400). In some embodiments, the pin (400) can include a mechanism to capture and retain the frangible portion that is severed upon insertion (such that the pin hole is not occluded with the discarded portion of cover (200). For instance, the pin (400) can be hollow or include an internal chamber to collect each pierced layer of layup segments (300) and the mask (200) upon insertion of the pin through these layers. This prevents any foreign object debris from interfering or compromising the manufacturing process.

FIG. 3F depicts an internal structural component (e.g. spar cap) (500) placement process which employs the placement pins as a point of reference, and in some embodiments as a load bearing member, to ensure the structural component (500) is correctly positioned within the blade. The structural component (500) can be positioned with respect to the location of the pin (400). For example, the structural component (500) can be positioned to abut against the pin(s) (400) to prevent displacement of the component (500).

As shown in FIG. 3G, in some embodiments the structural component(s) (520) can be positioned above, so as to receive partially or completely, the pin(s) (400) as the structural component (520) is positioned on top of the pins (400). In some embodiments, select pins (s) (400) are disposed on the exterior of, e.g., adjacent to, the structural component (500) to lock in or restrict the lateral position of the structural component (500), while select pin(s) (400) are received within the structural component (520) to lock in or restrict the vertical and horizontal position of the structural component (520).

Additionally, the overhead optical (e.g. laser) projection system can project the placement of the structural component (e.g. superimpose perimeter boundaries of the structural components) for verification or as a secondary means of proper positioning when consistent with the pin location (100/400); additionally, the pins, having greater accuracy in placement, can serve as a calibration reference for the overhead optical projections within the mold. In some embodiments the pins (400) are temporarily inserted into the pin holes (100) to facilitate installation of the internal structural components, and removed thereafter. In other embodiments, the pins (400) can be permanently retained within the final assembled blade.

Figure 3I:
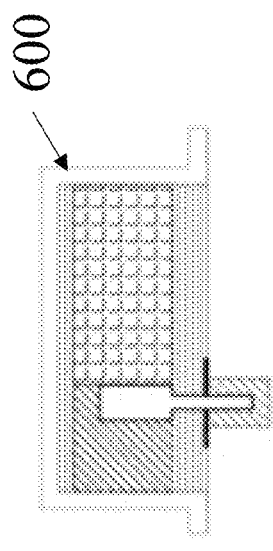

As shown in FIG. 3H, once the location(s) of the structural component (500, 520) are verified to be accurately positioned within the blade mold, a second section of additional layup segments (320) can be positioned on top of the structural components (500, 520). Upon completion of the layup process, a bag (600) can be sealed around the perimeter of the mold to create a vacuum and the resin infusion processes can conducted with the pins (400) included in the infusion area. The fitting tolerance of pins (400) and pin holes (100) prevents the ingress of infusion resin into the pin holes (100), as shown in FIG. 3I.

Figure 3J:
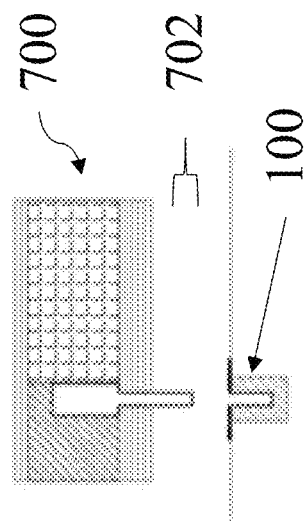
Figure 3K:
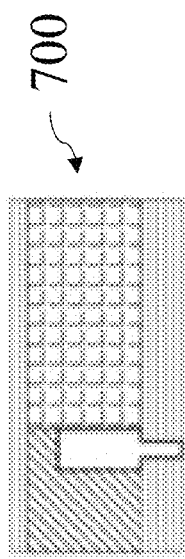
Figure 4:
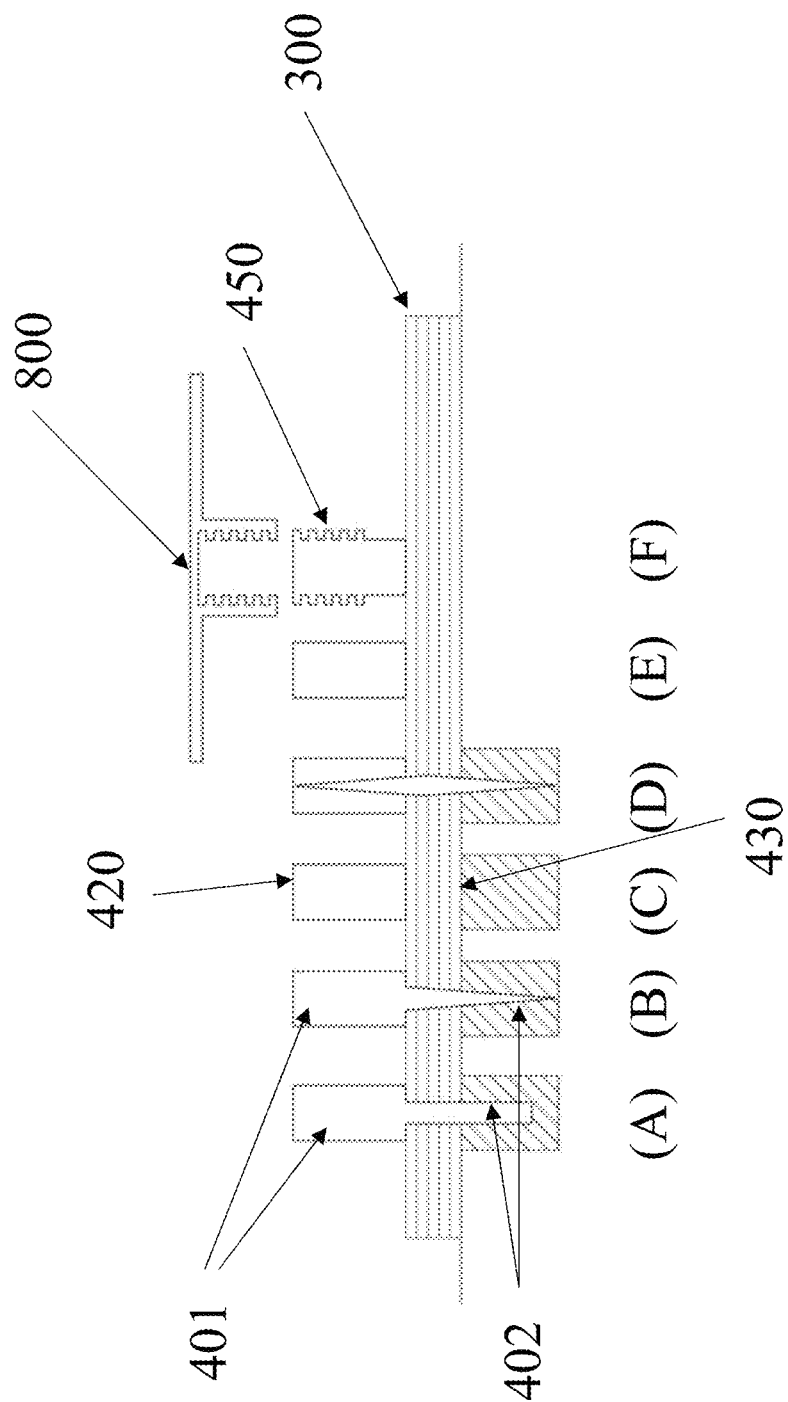
FIG. 4 depicts cross-sectional views of various pin geometries for inclusion within the completed mold, in accordance with the present disclosure.

As shown in FIG. 3J, after the resin infusion, and cure, processes are completed, the complete molded part which includes: first section of layup layers (300), pin(s) (400), structural components (500, 520), and second section of layup layers (320) are removed from the mold (100). In this embodiment, the pin(s) (400) permanently form part of the assembled/molded product. In some embodiments, the pins (400) extend beyond the external surface of the molded part (e.g. beyond the bottom surface of the first section of layup layers 300) by a distance (shown as 702) in FIG. 3J. These portion (702) of the pins (400) that extends beyond the external surface can be trimmed to provide a smooth and continuous external blade surface, resulting in a finished product as shown in FIG. 3K.

Pin Type and Geometry

FIG. 4A-F depict additional or alternative pin configurations that can be employed within the embodiments disclosed herein. In the exemplary pin embodiment shown in FIG. 4A, the pin can include a first (401) section having a larger cross-sectional area than the second section (402) which is inserted within the pin hole (100). The change in area can be an abrupt or stepped change, as shown in FIG. 4A, or a gradual taper as shown in 4B. Additionally or alternatively, the distal end of the pin (400) can be spaced from a bottom of the pin hole (100) as shown in FIG. 4A, or extend to abut the bottom of the pin hole as shown in FIG. 4B.

In some embodiments the pins do not form a blade-to-mold connection. Rather, the pin(s) remain in the mold and do not extend into the composite part being formed. In such embodiments, the pin(s) can be securely maintained in position by magnetic force. For example, in the embodiment shown in FIG. 4C, the pin (420) can be precisely located above a location in the mold with a magnetic footing (430) so as to: i) verify proper positioning of the structural component, e.g. by coinciding in location to the overhead projected boundaries of the structural component; and ii) serving as a load bearing element when a structural component is positioned in abutting fashion against the pin (420), as described above with reference to FIGS. 3F-H.

FIG. 4D depicts an exemplary embodiment similar to the embodiment shown in FIG. 4B, however, during the demolding process the diamond shape pin comes out of blade and only the pin head (e.g. the portion proximal to the widest part of the diamond-shaped pin) remains within the blade. Thus, in this embodiment, instead of trimming the extended piece of pin (702), the hole generated in the demolded blade is filled or plugged.

FIG. 4E depicts an exemplary view of the portion of the pin which remains within the blade when the embodiments of FIG. 4C or 4D are employed. For clarity, no holes are depicted in the layup segment layers (300), and indeed there are no holes when the magnetic pin embodiment of FIG. 4C is employed.

The pins can be inserted/positioned above the mold surface (100) by a separate apparatus than the overhead projector. Also, the pin hole (100) can be formed at a single location (e.g. center) of the spar cap, or at multiple locations on the spar cap surface. The precision pin system described herein is advantageous in that it allows for higher precision in placement of the spar cap than alternative techniques can provide. Additionally, the present disclosure provides rapid and accurate location/registration of the spar cap relative to the interior blade skin during layup of the blade skin segments. This avoids the need to employ fixtures of the external mold as the point of reference (which can be inaccurate and vary with different manufacturing cycles, and blade geometries). Additionally, the skin locator feature allows for rapid identification of locating parts directly featured on the spar cap and skin, while reducing error and providing instant visual confirmation of proper engagement.

In accordance with another aspect of the present disclosure, the precision pin system can also provide a gripping or clamping force to facilitate bonding of the structural component to the blade skin, an exemplary embodiment is shown in FIG. 4F. The pins can include a locking feature (e.g. threads 450) that releasably attaches to a compression plate (800). In the exemplary embodiment shown in FIG. 5A, pin includes a threaded portion (451) and a distal portion (452) which is inserted through the layers of layup segments (350) and received within the pin hole (150) of the mold. Next, the structural component (550) is positioned with respect to the pin (450) by being disposed in a proximate or abutting relationship to the upper end of pin (451), thereby limiting/preventing lateral movement, as shown in FIG. 5B. Thereafter, compression plate (800) can be positioned with a laterally extending flange portion (810) engaging the upper surface of the structural component (550) to provide a compressive clamping force. As the compression plate is rotated, the threaded locking feature (451) displaces the compression plate downwards thereby increasing the pressure applied to the structural component (550). The clamping force can be applied temporarily or the compression plate can be formed into part of the final molded product so as to maintain the compressive force permanently.

As shown, the compression plate (800) includes flanges (801, 802) symmetrically extending laterally from the pin shaft, however alternative (e.g. non-symmetrical) configurations can be employed. The compression plate (800) applies force to the structural component (550) which transfers that force in a uniformly distributed manner across the surface area of the structural component (550) which engages the top layer of layup segments (350). Also, the downwardly extending collar of the compression plate which receives the locking feature of the pin (451) can be sized such that it remains spaced from (i.e. avoids contacting) the top layer of layup segments (350), as shown in FIG. 5C, to avoid any undesired crimping or puncturing of the layup material.

Figure 6A:
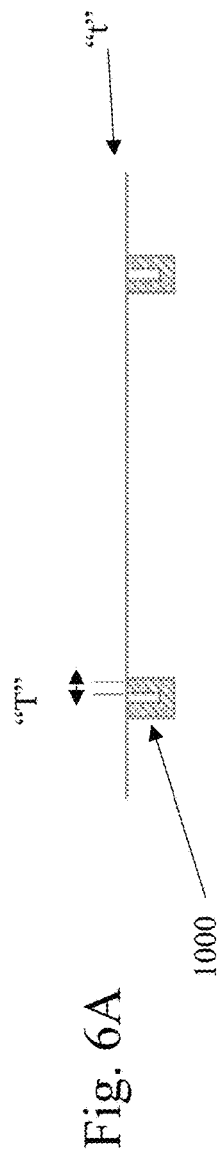
FIGS. 6A-I are cross-sectional views of a various stages of blade fabrication and pin and spar cap installation, in accordance with an embodiment of the present disclosure.
Figure 6B:
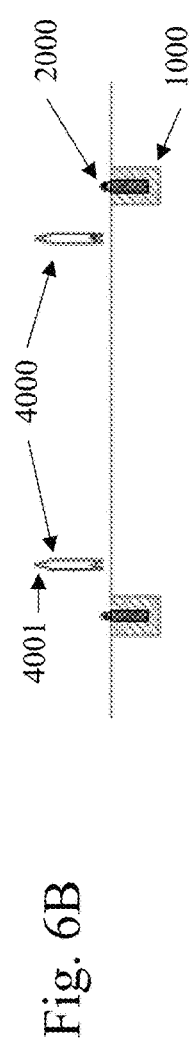

In accordance with another aspect of the disclosure, FIG. 6A depicts a cross sectional view (view A-A as shown in FIG. 2) of an exemplary pin hole (1000). This exemplary embodiment of pin hole (1000) depicts a cylindrical hole, however alternative geometries (e.g. curved, non-linear) are within the scope of the present disclosure. Also, the pin hole (1000) can have a reinforced cavity for receiving the pin such that the perimeter of the sidewall defining the pin hole has a thickness "T" which is greater than the thickness "t" of the mold surface proximate the pin hole. This additional thickness provides strength and rigidity in the pin hole (1000) for receiving and guiding the stud or pin when inserted therein. FIG. 6B depicts a stud member (2000) which can be at least partially inserted within the pin hole (1000) prior to blade manufacturing steps (e.g., gel application) to avoid resin ingress into the pin holes. In some embodiments, the studs (2000) are sized to extend above the blade mold surface, and can be permanently or releasably secured within the hole (1000) (e.g. either via friction fit or via a threaded fastener, tongue and groove, etc.)

Figure 6C:
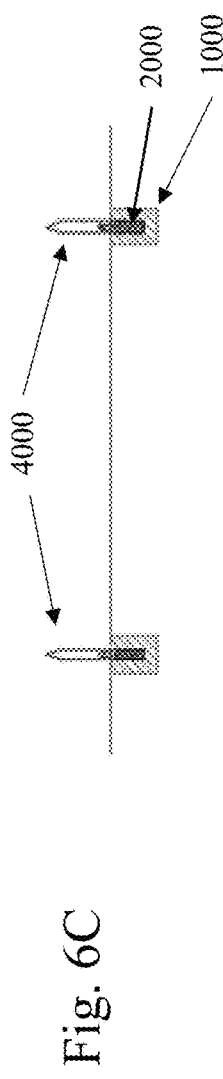

FIG. 6C depicts the insertion of the locating feature (4000) which can be a pin, or an elongated member (e.g. wall), though this disclosure will refer to the locating feature as "pin" throughout for convenience (however it is to be understood that alternative, e.g. non-cylindrical, geometries are contemplated to be within the scope of the present disclosure). As shown, the pins (4000) are attached to the top end of the studs (2000), which are previously inserted into the mold pin holes (1000). The pins (4000) can be releasably secured to the upper end of the studs (which in the exemplary embodiment shown, project above the mold surface) via mechanical coupling e.g., friction fit between male/female members, threaded fastener, tongue and groove, etc. Additionally or alternatively, the pins (4000) can be connected to the studs (2000) via magnetic or adhesive bonding. In some embodiments, the connection between pins (4000) and studs (2000) is frangible such that during the demold process (i.e. removing the blade from the mold) the pins (4000) remain with the molded blade while the studs (2000) remain in the mold (1000).

Figure 6D:
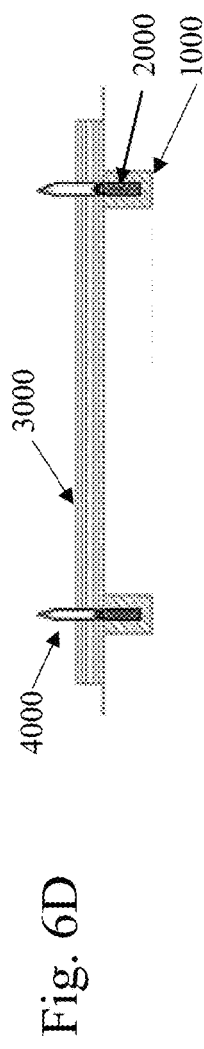
Figure 6E:
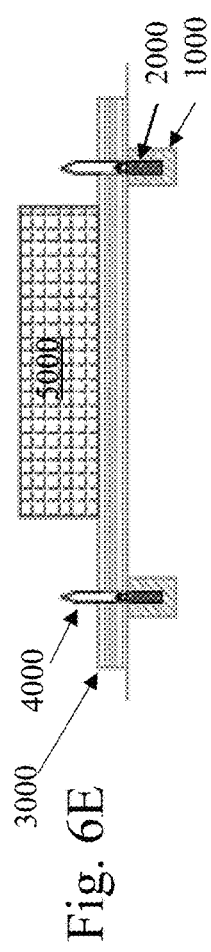

FIG. 6D depicts a plurality of layers of composite fiber panels, or "layups" (3000) deposited on top of the pin (4000) and stud (2000) assembly, which is disposed on top of the pin hole (1000). The pins (4000) are passed through the layup layers (3000) and extend above the top surface of the layup layers, as shown. Upon completion of the layup process, the tips of the pins (4000) remain visible over the composite glass layers (3000). These reference marks of the pin heads (4000) serve as a visual basis for placement of spar cap. In some embodiments the pins (4000) can include markings to denote the height of the stack of layup segments (3000) to provide a visual aid to an operator confirming that a predetermined number/height of layup segments has been installed, and/or serve as a basis of comparison of the status of layup segment at a given location of the blade with respect to another (e.g. root vs. tip).

Figure 7A:
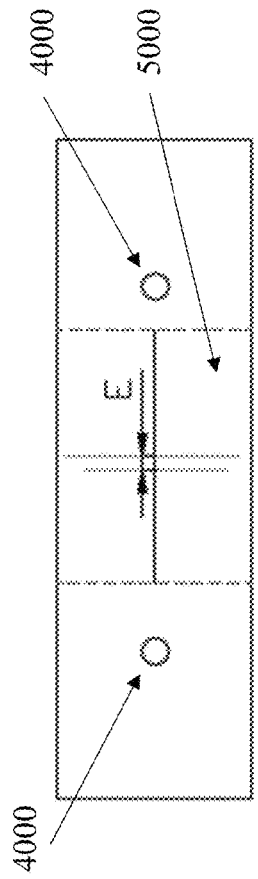
FIG. 7A-D depict cross-sectional views of various pin and cam geometries for accurate positioning of the spar caps, in accordance with the present disclosure.

FIG. 7A depicts a top view of the mold after the layers of layup segments have been deposited. The internal structural component (e.g. spar cap) (5000) placement process employs the placement pins as a point of reference, and in some embodiments as a load bearing member. The structural component (5000) can be positioned with respect to the location of the pin (4000). For example, the structural component (5000) can be positioned within the mold in the space between pins (4000). As shown, there is a placement error (E) between the nominal center line (the smaller vertical line) and the actual centerline (the larger vertical line) of the spar cap (5000) whose side edges are shown in phantom for reference.

Figure 6F:
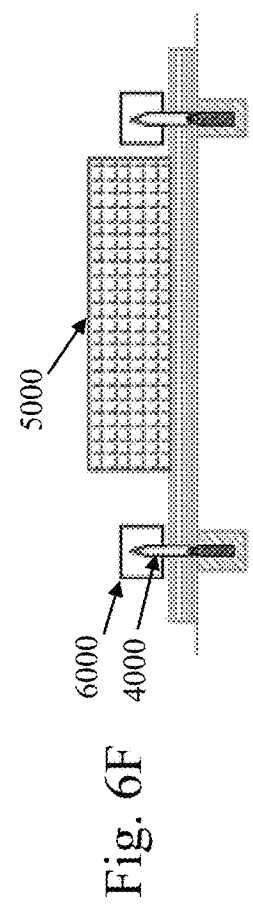
Figure 7B:
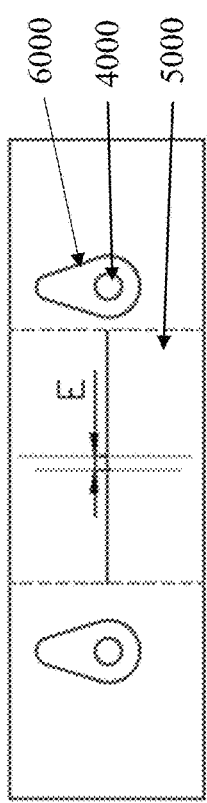

Once the spar cap (5000) is positioned in place between pins (4000) actuators, e.g. cam heads, (6000) are installed on the top of the pins (4000) and operable to abut against to effect or prevent displacement of the component (5000). The pins can remain stationary while the cam heads rotate. A variety of actuators, e.g. cam heads (6000), can be employed having geometries which are eccentric, oval, elliptical or of snail shape. (See FIGS. 6F and 7B).

Figure 6G:
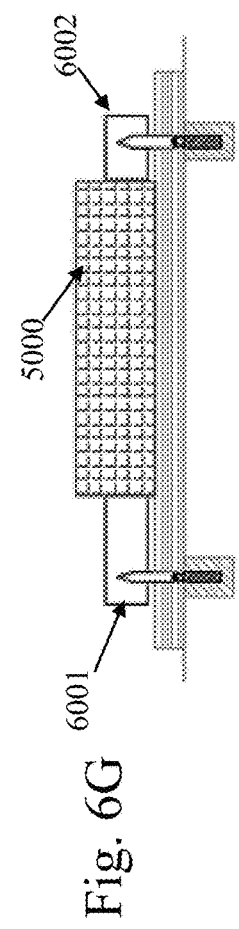
Figure 7C:
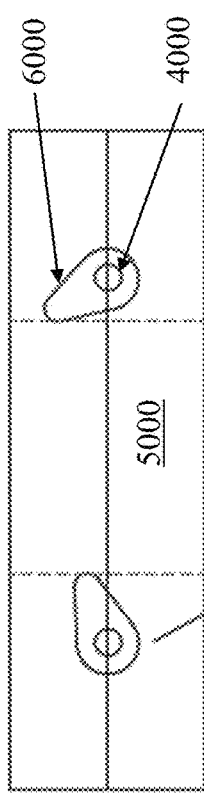
Figure 7D:
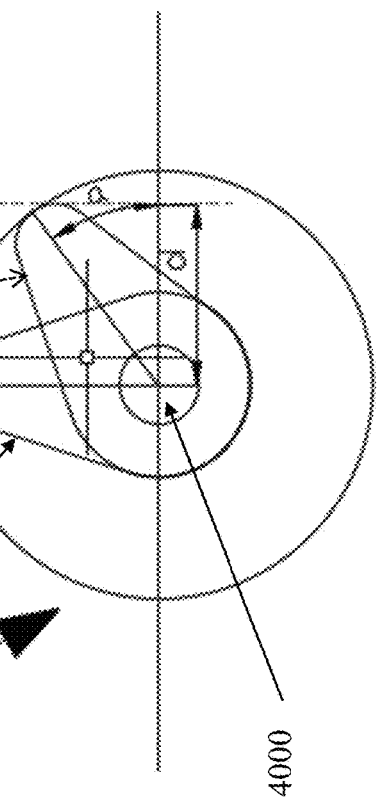

In accordance with an aspect of the present disclosure, the actuators (6000) can precisely evaluate the error (E) of the spar cap positioning. For example, cam heads (6000) can be rotated to engage the side of spar cap (5000), as shown in FIGS. 6G and 7C. The actuators (6000) can be moved independently of each other, and/or simultaneously. Also, each actuator (6000) can exhibit a 360 degree range of motion, with each actuator oriented to a different angle, as required to engage the spar cap (5000). As shown in Figured 7C-D, the angle of rotation (a) between positions 6000 and 6000' could be correlated to relative distance (d) and accordingly placement error of the spar cap (5000) is evaluated (the side edge of the spar cap being shown in phantom for reference). If the error is exceeding a predetermined tolerance, the spar cap (5000) can be moved laterally, e.g., by rotating the cam heads (6000) an appropriate degree "a" or distance to impart a force to shift the spar cap (5000) laterally. In some embodiments the cams can be powered to assist in the rotation (and thus displacement of the spar cap), e.g. via electric, hydraulic or pneumatic power supply. In some embodiments external tools, e.g. hammer or awls can be employed to exert a force on the spar cap (5000) via tapping or other methods to create the requisite displacement; and the evaluation process is repeated.

When shifting the spar cap (5000), a first cam is moved so as to disengage from the spar cap (to thereby permit movement of the spar cap in the direction of that first cam), while a second cam (6002) remains engaged with the spar cap (to prevent undesired movement of the spar cap in the "wrong" direction). Thus, the degree or amount of rotation of a first cam can be different from a second cam, as shown in FIGS. 6G and 7C where cam 6001 has been rotated a greater distance (hence the larger cross-sectional profile shown) than cam 6002. Additionally or alternatively, the cams 6000 can be oriented to rotate in a vertical plane to engage the spar cap 5000 on the top surface and press down or "sandwich" the spar cap.

Figure 6H:
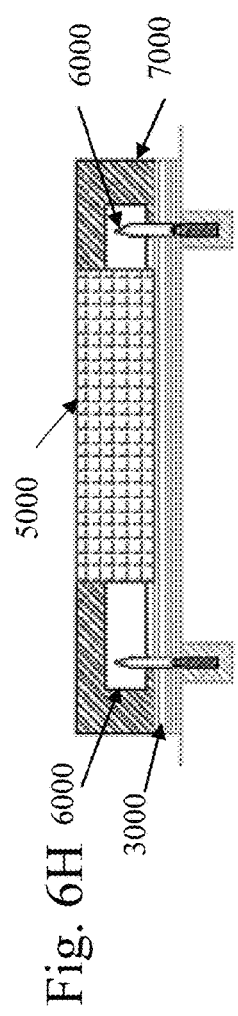

Once the final locations of the spar cap boundaries are confirmed to be accurately positioned within the mold, the actuators (6000) can be removed from the pins (4000). In some embodiments the actuators (6000) have a recess or slot for receiving a top portion of the pins (4000) and can be vertically coupled (i.e. telescopingly received by the pins). The actuators can be replaced by core material (7000) (e.g. balsa wood) that is sized in accordance with the distance measured by the cam rotation, as shown in FIG. 6H.

As shown in FIG. 3H, once the location of the structural component (5000) are verified to be accurately positioned within the blade mold, a second section of additional layup segments can be positioned on top of the structural components (5000), pins (4000), and first section of layup segments (3000). As previously described above, upon completion of the layup process, a bag can be sealed around the perimeter of the mold to create a vacuum and the resin infusion processes can conducted with the pins (4000) included in the infusion area. The fitting tolerance of studs (2000) and pin holes (1000) prevents the ingress of infusion resin into the pin holes (1000). Advantageously, the presence of the pins (4000) with the spar caps (5000) during these subsequent operations ensures no displacements occur during infusion and cure processes.

Figure 6I:
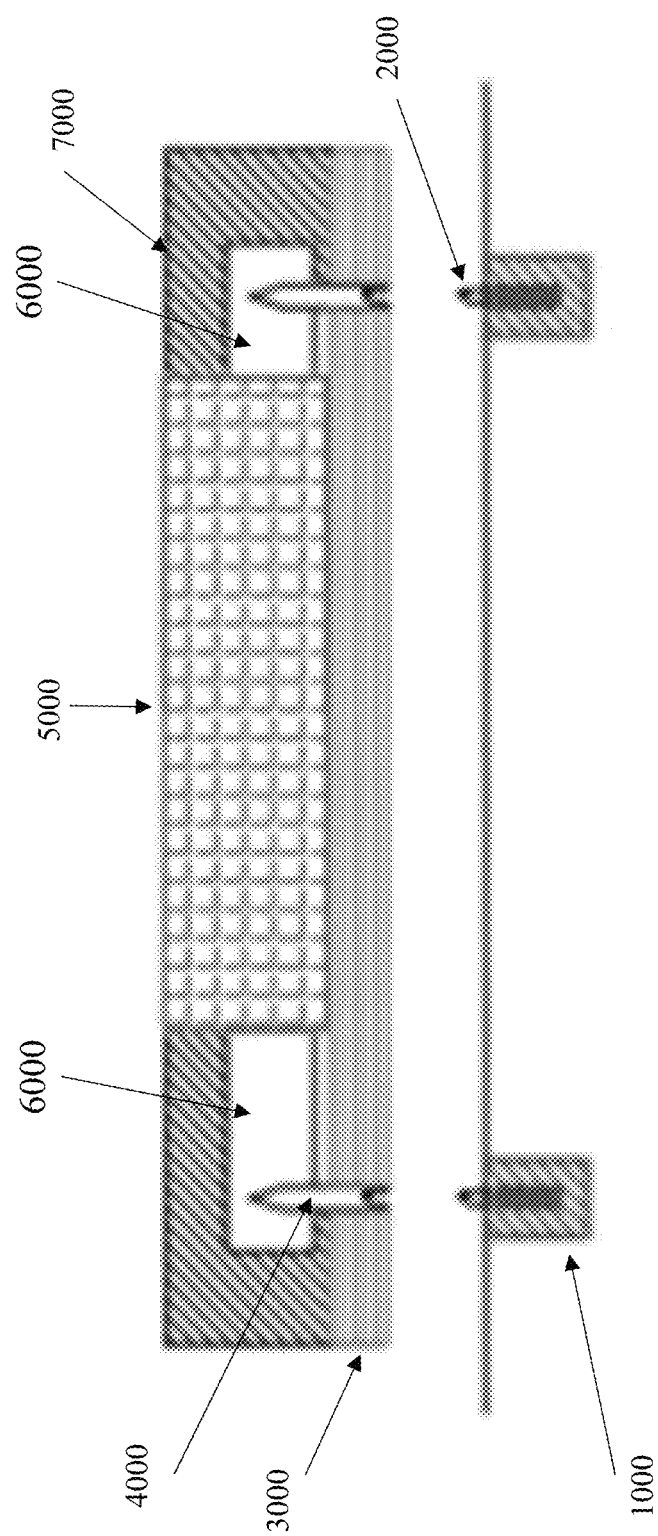

As shown in FIG. 6I after the resin infusion, and cure, processes are completed, the complete molded part which includes: first section of layup layers (3000), pin(s) (4000), structural components (5000), core material (7000) and second section of layup layers are removed from the mold (1000) by disengaging the pins (4000) from the studs (2000). The mechanical connection between the pin (4000) and stud (2000) is configured such that under relative vertical motion, the pin (4000) disengages or separates from the stud. Accordingly, the pins remain with the blade and the studs remain with the mold. There remains a small pin hole (equal to the shape of stud coming out of the mold). In this embodiment, the pin(s) (4000) permanently form part of the assembled/molded product and remain as hard stops preventing spar cap (5000) drift. The studs (2000) can be sized so as to extend above the top surface of the mold (1000), such that after separating the studs (2000) from the pins (4000), recesses remain in the molded product at the locations of the studs (2000).

Additionally or alternatively, the studs (2000) can be sized so as to not extend above the top surface of the mold (1000), with the pins (4000) extending beyond the mold surface and into the pin hole (1000), resulting in pins (4000) which extend beyond the external surface of the molded part (e.g. beyond the bottom surface of the first section of layup layers 3000). This portion of the pins (4000) that extends beyond the external surface can be trimmed to provide a smooth and continuous external blade surface, resulting in a finished product.

Pin Type and Geometry

As referenced above, a variety of pin configurations can be employed within the embodiments disclosed herein. In the exemplary pin embodiment shown in FIG. 6B, the pin can include a first (4001) section having a smaller cross-sectional area than the second section (4002) which is inserted within, receives, or is attached to the stud (2000) within pin hole (1000). The change in area can be an abrupt or stepped change or a gradual taper. Additionally or alternatively, the distal end of the stud (2000) can be spaced from a bottom of the pin hole (1000), or extend to abut the bottom of the pin hole.

Accordingly, the present disclosure provides numerous advantages and improvements over conventional blade structures and manufacturing techniques, including providing a high precision point of reference with respect to internal blade components, rather than external mold frame, thereby the reference features can remain inside the vacuum bagging.

It should be noted, that reference to "above", "below", "top", "bottom", etc. herein is relative and non-limiting as the structures and techniques described herein are equally applicable to spar caps formed on the suction side and pressure side of a blade.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A wind turbine blade mold system comprising:
a first mold surface, with at least one aperture located therein;
at least one stud having a first end and a second end defining a length therebetween, the second end of the stud disposed within the at least one aperture;
at least one pin having a first end and a second end defining a length therebetween, with the second end of the at least one pin connected to the first end of the at least one stud;
at least one actuator, the at least one actuator disposed on the at least one pin, wherein a portion of the actuator is configured to engage a structural component of a wind turbine blade.

2. The system of claim 1, further comprising a plurality of apertures asymmetrically disposed about a spanwise central axis of the blade mold.

3. The system of claim 1, further comprising a plurality of apertures disposed about along the length of the blade mold.

4. The system of claim 1, wherein a perimeter of the first end of the at least one pin is greater than a perimeter of the second end of the at least one pin.

5. The system of claim 1, wherein at least one pin is configured with an asymmetric geometry.

6. The system of claim 1, further comprising a compression plate component of the blade.

7. The system of claim 6, wherein the second end of the at least one pin includes a locking feature, the locking feature configured to engage the compression plate.

8. The system of claim 1, wherein the first end of the at least one stud extends beyond the first surface of the mold.

9. The system of claim 1, wherein the at least one pin is releasably connected to the at least one stud.

10. The system of claim 1, wherein the at least one actuator includes a cam, the cam rotatable about a central axis of the at least one pin.

11. The system of claim 1, wherein the at least one actuator includes an asymmetric cam.

12. The system of claim 1, further comprising a cover disposed above the at least one aperture.

13. The system of claim 12, wherein the cover includes a frangible portion, the frangible portion retained within the pin upon insertion of the at least one pin into the aperture.

14. The system of claim 12, wherein the second end of the at least one pin includes a planar top surface.

* * * * *